United States Patent
Yang et al.

(10) Patent No.: US 10,321,305 B2
(45) Date of Patent: Jun. 11, 2019

(54) NODE AND METHOD FOR MANAGING A PACKET DATA NETWORK CONNECTION AND/OR AN INTERNET PROTOCOL-CONNECTIVITY ACCESS NETWORK SESSION

(71) Applicant: TELEFONAKTIEBOLAGET LM ERICSSON (PUBL), Stockholm (SE)

(72) Inventors: Yong Yang, Kållered (SE); Roland Gustafsson, Bengtsfors (SE); Gunnar Rydnell, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 88 days.

(21) Appl. No.: 14/896,064

(22) PCT Filed: Nov. 13, 2015

(86) PCT No.: PCT/EP2015/076581
§ 371 (c)(1),
(2) Date: Dec. 4, 2015

(87) PCT Pub. No.: WO2017/080622
PCT Pub. Date: May 18, 2017

(65) Prior Publication Data
US 2017/0265245 A1    Sep. 14, 2017

(51) Int. Cl.
*H04W 8/24*        (2009.01)
*H04W 76/20*    (2018.01)

(52) U.S. Cl.
CPC ............. *H04W 8/24* (2013.01); *H04W 76/20* (2018.02)

(58) Field of Classification Search
CPC ................................ H04W 76/04; H04W 8/24
USPC .......................................................... 370/328
See application file for complete search history.

(56) References Cited

U.S. PATENT DOCUMENTS

| 2015/0029999 A1* | 1/2015 | Horn ..................... H04W 36/22 370/331 |
| 2015/0365789 A1* | 12/2015 | Salot ....................... H04W 4/02 455/456.1 |
| 2016/0100362 A1* | 4/2016 | Palanisamy ....... H04W 52/0212 370/311 |

FOREIGN PATENT DOCUMENTS

EP    2648434 A1    10/2013

OTHER PUBLICATIONS

International Search Report and Written Opinion in PCT/EP2015/076581 dated Feb. 11, 2016, 11 pages.
Ericsson, SA WG2 Meeting S2#106, S2-143940, San Francisco, Nov. 17-21, 2014, "Detailing solution 1," 3 pages.
ZTE, SA WG2 Meeting #104, S2-142450, Jul. 2, 2014, "Network-initiated IP flow mobility for S2a," 9 pages.

(Continued)

Primary Examiner — Ricky Q Ngo
Assistant Examiner — Ellen Kirillova
(74) Attorney, Agent, or Firm — Rothwell, Figg, Ernst & Manbeck, p.c.

(57) ABSTRACT

A method performed in a first network node includes the first network node transmitting, to a second network node, a first message including a user equipment (UE) status request of a UE. The method further includes the first network node receiving, from the second network node, a second message including a UE status response. The method also includes the first network node determining, based on the received UE status, whether to modify an PDN connection and/or a corresponding IP-CAN session associated with the UE.

37 Claims, 14 Drawing Sheets

(56) References Cited

OTHER PUBLICATIONS

3GPP TS 23.060 V12.0.0 (Mar. 2013)Technical Specification: 3rd Generation Partnership Project; Technical Specification Group Services and System Aspects; General Packet Radio Service (GPRS); Service description; Stage 2 (Release 12).

3GPP TS 23.401 V12.0.0 (Mar. 2013) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 12).

3GPP TS 29.274 V12.0.0 (Mar. 2013) Technical Specification: 3rd Generation Partnership Project; Technical Specification Group Core Network and Terminals; 3GPP Evolved Packet System (EPS); Evolved General Packet Radio Service (GPRS)Tunnelling Protocol for Control plane (GTPv2-C); Stage 3 (Release 12).

\* cited by examiner

US 10,321,305 B2

NODE AND METHOD FOR MANAGING A PACKET DATA NETWORK CONNECTION AND/OR AN INTERNET PROTOCOL-CONNECTIVITY ACCESS NETWORK SESSION

CROSS REFERENCE TO RELATED APPLICATION

This application is a 35 U.S.C. 371 National Phase Entry Application from PCT/EP2015/076581, filed Nov. 13, 2015, which claims the benefit of U.S. Ser. No. 62/050,338 filed Sep. 15, 2014, the disclosures of which are incorporated by reference in their entirety.

TECHNICAL FIELD

Disclosed herein are, for example, methods, network nodes, and computer program products for status query by the policy charging control (PCC) node to the evolved pact core (EPC).

BACKGROUND

When a user equipment (UE) has suspended its packet switched (PS) service (e.g., when UE performs CSFB to GERAN, which doesn't support Dual Transfer Mode, a common scenario, the UE is unable to communicate with a network entity in the PS core network. In this case, it is not optimal if the Policy Charging Control (PCC) node initiates some updates for the UE context or the active Packet Data Network (PDN) connection to that triggers signaling towards the UE that fails. In general, the PCC node may need to use UE status information of different kinds in addition to the reachability status of the UE.

The PCC system is unaware of UE mobility status information. Furthermore, when the system becomes more complicated, this principle proves inefficient. An example of this inefficiency is seen in the handling of the UE when suspended. For example, CSFB or SRVCC are existing features, however, there is no specific handling when UE gets into suspend state except the MME/SGSN informing the SGW/PGW about the suspension. Furthermore, there is no specific handling when UE gets into a power saving state only other than mobility management node holding such information. Additionally, the same problem would occur when the UE is in radio shadow and the MME has cleared the PPF flag due to not being able to page the UE.

When the UE is not reachable by the Packet Core Network (e.g., UE is in a suspend state, or UE is in a power saving state, or the serving MME/SGSN has cleared PPF flag for the UE) the UE can't be reached. Thus, in this situation, there is no reason for the PCC node to trigger bearer modifications. One such signaling case is PCRF initiated QoS modification. When the PCRF indicates to the PGW over the Gx interface that a QoS modification is needed, the PGW initiates an Update Bearer Request towards the UE via the SGW and the MME/SGSN. However, this Request will fail due to the UE condition of not being reachable for paging (i.e., UE is not listing for pages). This causes unnecessary signaling in the network system. Furthermore, the QoS change requested by the PCC may not be effectuated and the PCC and the EPC systems may be un-synchronized.

SUMMARY

At least one object of some of the example embodiments presented herein is to provide an efficient means of providing communications to a user equipment. According to some embodiments, a method for managing a PDN connection and/or an IP-CAN session associated with a user equipment is provided. The method performed in a first network node. The method includes the first network node transmitting, to a second network node, a first message including a user equipment (UE) status request of a UE. The method further includes the first network node receiving, from the second network node, a second message including a UE status response. The user equipment status of the first and second messages indicates at least one of (i) whether the user equipment is reachable, (ii) whether the user equipment is in an idle mode or an active mode, (iii) a location of the user equipment, (iv) a time zone in which the user equipment is located, and (v) a serving network in which the user equipment is registered. The method also includes the first network node determining, based on the received UE status, whether to modify an PDN connection and/or a corresponding IP-CAN session associated with the UE.

In some embodiments, a first network node includes a processor and a computer readable medium coupled to the processor, said computer readable medium containing instructions executable by the processor. The first network node is operative to transmit, to a second network node, a first message including a user equipment (UE) status request of a UE. The first network node is further operative to receive, from the second network node, a second message including a UE status response. The first network node is also operative to determine, based on the received UE status, whether to modify an PDN connection and/or a corresponding IP-CAN session associated with the UE.

In some embodiments, a computer product for managing a first network node includes a non-transitory computer readable medium storing computer instructions for transmitting, to a second network node, a first message including a user equipment (UE) status request of a UE. The non-transitory computer readable medium further includes computer instructions for receiving, from the second network node, a second message including a UE status response. The non-transitory computer readable medium further includes computer instructions for determining, based on the received UE status, whether to modify an PDN connection and/or a corresponding IP-CAN session associated with the UE.

Some of the example embodiments are directed towards a second network node for managing a PDN connection and/or an IP-CAN session associated with a user equipment. The second network node is configured for use in a wireless communications network. The method comprises receiving, from a first network node, a first message including a user equipment status request of a user equipment. The method also comprises determining the status of the user equipment. The method further comprises transmitting, to the first network node, a second message including a user equipment status response comprising the determined status of the user equipment. The user equipment status of the first and second messages indicates at least one of (i) whether the user equipment is reachable, (ii) whether the user equipment is in an idle mode or an active mode, (iii) a location of the user equipment, (iv) a time zone in which the user equipment is located, and (v) a serving network in which the user equipment is registered.

Some of the example embodiments are directed towards a second network node comprising a processor and a computer readable medium coupled to the processor. The computer readable medium comprising instructions executable by the processor where the second network node is operative to receive, from a first network node, a first message including a user equipment status request for a user equipment. The second network node is further operative to determine the status of the user equipment. The second network node is also operative to transmit, to the first network node, a second message including a user equipment status response comprising the determined status of the user equipment.

BRIEF DESCRIPTION OF THE DRAWINGS

The accompanying drawings, which are incorporated herein and form part of the specification, illustrate various embodiments.

DETAILED DESCRIPTION

Figure 1:
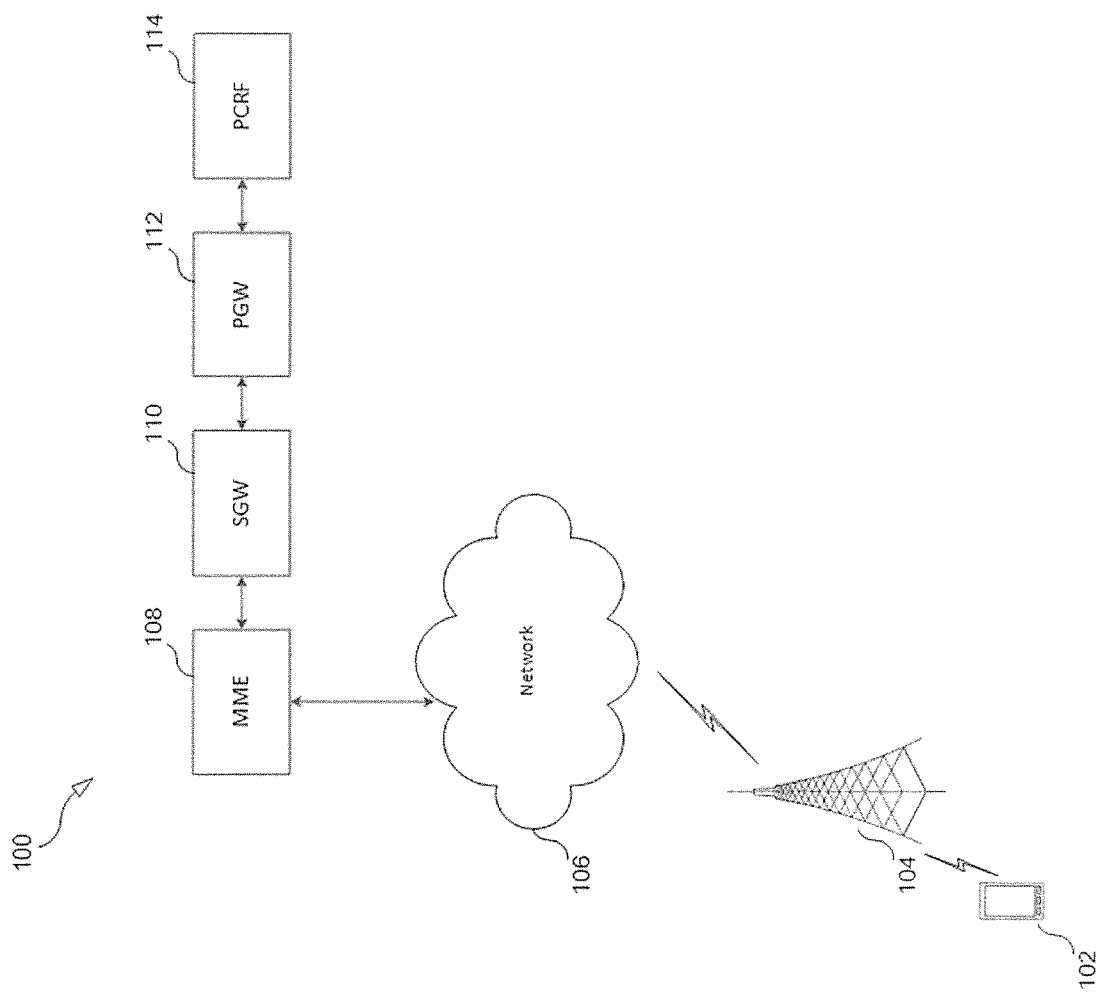
FIG. 1 illustrates an exemplary wireless communication system according to some embodiments.

The example embodiments are described herein with the use of a first network node and a second network node. For the purpose of explanation, the example embodiments are described with the first network node being a PCRF. It should be appreciated that the first network node may be a Policy and Charging Rules Function (PCRF) or a Service Capability Exposure Function (SCEF). According to some of the example embodiments, the first network node may comprise both the PCRF and the SCEF. In such example embodiments, the PCRF may instruct the SCEF to request a user equipment status from the second network node.

According to some embodiments, the PCRF can get UE status information. This UE status information may indicate whether the UE is reachable, whether the UE is in an idle or connected mode, where the UE is located (e.g., user location information), a UE time zone, which serving network (SN) UE is registered in, UE Presence Area from the mobility management entities (e.g. MME, SGSN), etc. In some embodiments, the PCRF, based on this UE status information, determines if PCRF initiated IP-CAN session modification procedure should be invoked or not. For example, when the UE is not reachable, the PCRF delays a modification to a UE bearer. The PCRF can also indicate if it requires the MME to report if the UE status has been changed.

According to some embodiment, the PCRF determines that there is a need to do a PCRF initiated IP-CAN session modification procedure. Before sending a modification request over Gx (e.g., G-type interface) to the PCEF (e.g., PGW/GGSN), the PCRF sends a new message referred to as a "UE status Request" to the MME over Sx, where the PCRF may also include an indication to request mobility management node to report certain UE status events. The UE status events indicate, for example, whether a UE reachable state is changed, the UE is entering a certain location, etc. The PCRF may also reuse an existing message with additional flag or cause code indicating the purpose of the message is to fetch the UE status. The PCRF may also include an indication to request the mobility management node to report certain UE status events such as whether the UE reachable state is changed, the UE is entering a certain location, etc. The mobility management node may report the UE status events over an Np interface (between RCAF and PCRF) and Nq/Nq' interface (between RCAF and MME/SGSN).

In some embodiments, the PCRF sends a Random Access Response (RAR) message to the PGW/GGSN(PCEF) over the Gx interface with a new flag or a new Event Trigger to indicate that the UE status. The PCRF may also include an indication to request mobility management node to report certain UE status events such as whether the UE reachable state is changed, the UE is entering a certain location. After receiving the RAR message, the PGW/GGSN sends Update Bearer Request or Update PDP context request with the same new flag to indicate to fetch the UE status.

In some embodiments, the MME does not page the UE if UE is in an idle mode and instead, provides the current UE status information. The MME may send back the new message referred as the "UE status Response" to the PCRF indicating the UE status, including the reachability status of the UE. The MME may further send back a new message, preferably called "UE status Response" or an existing response message with UE status information over Nq/Nq' and Np interfaces. The MME may also send an update bearer response message, including UE status information, where the PGW subsequently forwards UE status information to the PCRF. According to some embodiments, based on the UE status information, the PCRF determines whether the IP-CAN session should be continued or not. For example, if the UE status is indicating that the UE is reachable, the PCRF may continue to update the QOS towards the PGW as usual, otherwise, the PCRF delays the update.

According to some embodiments, the "UE Status" is an information element (IE) sent from the mobility management node (e.g., MME/SGSN), to the PCRF via different alternatives as described above. This IE may include, but not limited to UE ID (IMSI), UE Reachable (Yes/No), UE mobility state (idle/connected), UE Time Zone, ULI (User Location Information as specified in 3GPP TS 29.274), UE PRA information, UE serving network identifier, and/or any other dynamic or permanent UE status that is provided by the EPC to the PCC system.

In some embodiments, when the PCRF initiated IP-CAN session modification procedure is triggered, and when the PCEF (PGW or GGSN) is aware that the UE is not reachable (e.g., UE is suspended), the PCEF may include a new cause code indicating that the UE is not reachable. After receiving this cause code, the PCRF does not retry this procedure until the PGW indicates that the UE is reachable by using a new flag.

According to some embodiments, the mobility management node may trigger a message, either via Sx, or via Nq/Nq' and Np, or via the existing EPC interfaces (S11/S4 and S5/S8 and Gx) when PCRF subscribed UE status events are met (e.g., when UE becomes reachable). Furthermore, the mobility management node triggers a message based on the configuration (e.g., it is configured to report UE become reachable).

FIG. 1 illustrates an embodiment of a wireless communication system 100. The system includes a UE 102 such as a mobile cellular device in communication with a base station 104. Although only one UE and base station are illustrated in FIG. 1, it is understood by one of ordinary skill in the art that the wireless communication system 100 can include multiple UE's and multiple base stations. The base station 104 may communicated with a network 106, which is in communication with a management node such as MME 108. The MME 108 may be in communication with a serving gateway (SGW) node 110. The SGW 110 may be in communication with a packet data network (PDN) gateway (PGW) node 112. The PGW may further be in communication with the policy charging rules function (PCRF) node 114.

In some embodiments, the non-limiting term UE is used. The UE herein can be any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology such as "radio network node" or simply "network node (NW node)," is used. The network node can be any kind of network node which may comprise of a base station, radio base station, base transceiver station, base station controller, network controller, evolved Node B (eNB), Node B, relay node, access point, radio access point, Remote Radio Unit (RRU) Remote Radio Head (RRH), etc.

The embodiments are described using LTE concepts. However, the embodiments are applicable to any RAT or multi-RAT systems, where the UE regularly assess the serving cell performance by the virtue of the RLM procedure, or equivalent procedures, e.g., LTE FDD/TDD, WCDMA/HSPA, GSM/GERAN, Wi Fi, CDMA2000 etc.

Figure 2:
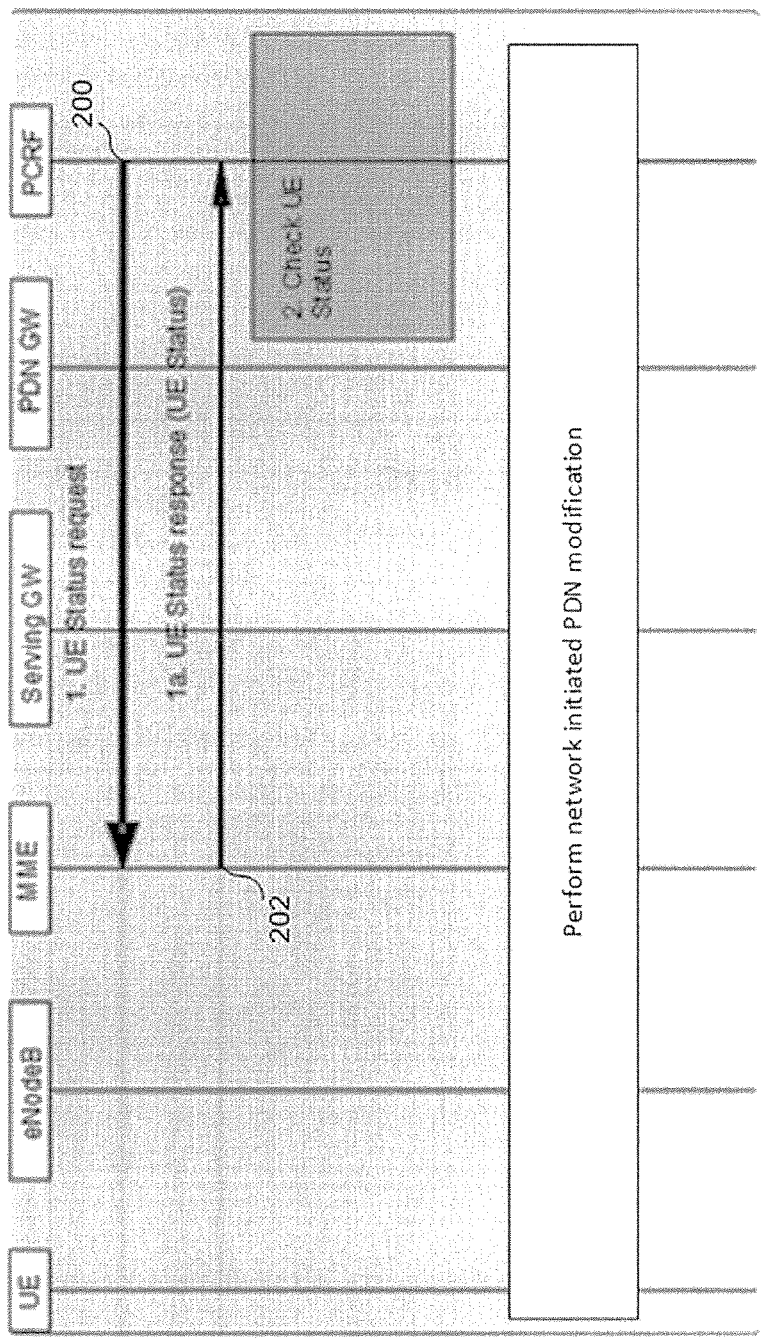
FIG. 2 is a sequence diagram according to some embodiments.
Figure 3:
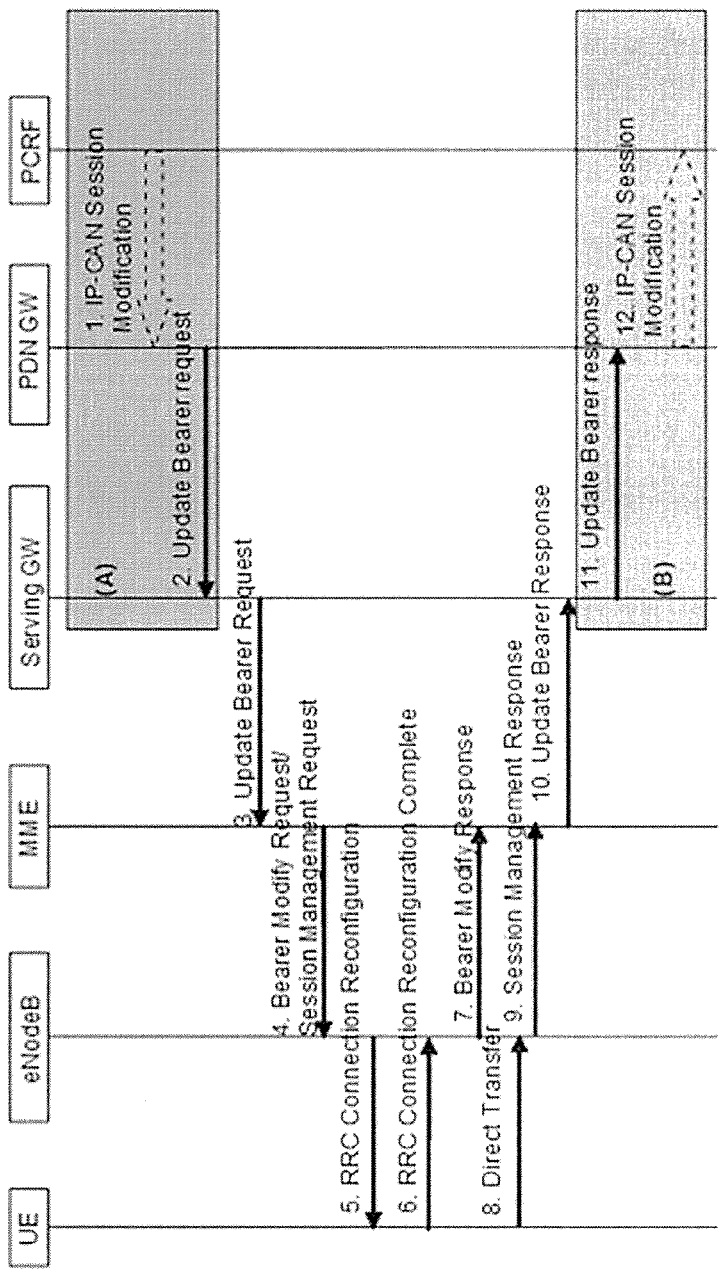
FIG. 3 is a sequence diagram according to some embodiments.

FIG. 2 illustrates a sequence diagram in which the PCRF sends a UE status request in step 200. In some embodiments, the UE status request is transmitted over an S-type interface (e.g., Sx interface) from the PCRF to the MME. In step 202, the UE sends a UE status response 202 to the PCRF. In step 204, the PCRF determines whether to continue a network PDN modification based on the UE status response. For example, if the UE status response indicates that the UE is reachable or in an active state (e.g., listening to pages), the PCRF determines that the network initiated PDN modification should be continued. FIG. 3 illustrates an embodiment of a sequence diagram of a PDN modification that is performed in response to the PCRF determining that the network initiated PDN modification should be continued.

In some embodiments, the same UE Status Req may be used to request other types of UE status such as Time Zone, ULI info, User Plane Congestion (UPCON) for the cell of the UE. In the case where the PCC receive UPCON information, the PCRF may take steps to modify the UE bearers in order to alleviate the user plane congestion situation. The UPCON information may be received from the node RACF ultimately, but can be sent to the PCC via existing nodes and interfaces e.g. the MME and the Nq and S5 interfaces, or via new interfaces.

If the MME indicates to the PCRF in the "UE Status Response" that the UE is not reachable, the PCRF should not proceed with the PDN modification procedure. The MME may later, when the UE becomes reachable (e.g., when the UE makes a TAU), indicate to the PCRF that the UE is now reachable. The PCRF may indicate in the UE Status Request if this indication is needed or not.

Figure 4:
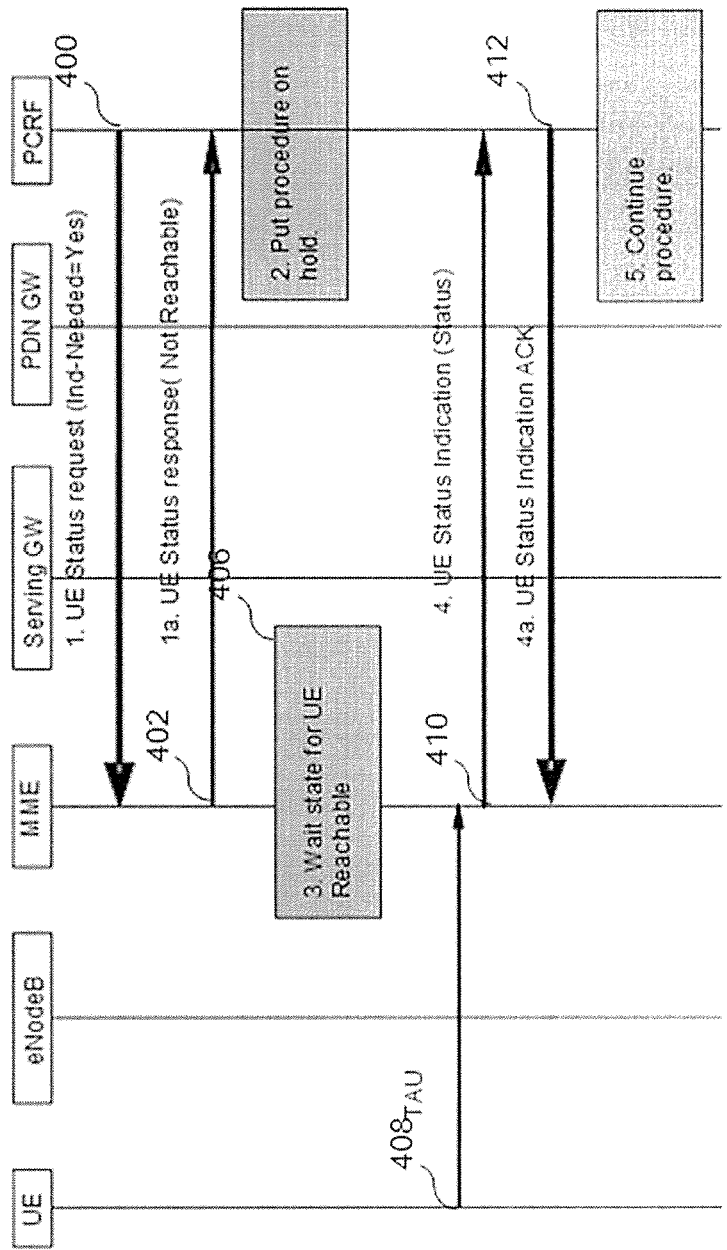
FIG. 4 is a sequence diagram according to some embodiments.

FIG. 4 illustrates an example sequence diagram where the MME informs the PCRF that the UE becomes reachable. In step 400, the UE PCRF sends a UE status request to the MME. In step 402, the MME sends a UE status response to the PCRF. In step 404, the UE determines that from the UE status response that either the UE is not reachable or in a power saving mode and determines that the PDN modification procedure should be placed on hold. In step 408, the MME receives a tracking area update (TAU) message from the MME, which indicates that the UE is now listening to pages from the MME. In step 410, the MME sends a UE status response indicating that the UE is reachable. In step 412, the PCRF sends an acknowledgement to the MME. In step 414, the PCRF continues the network initiated modification procedure. In step 400, the PCRF can set a flag to indicate that the UE status indication is not needed and schedule polling for the UE status using the message "UE Status Request" to the MME at a later time.

According to some embodiments, a new flag or a new event trigger will be introduced over the Gx interface. Furthermore, a new flag will also be introduced in GTP messages such as the Update Bearer Request or Update PDP context request. Additionally, the PCRF may include an indication to request mobility management node to report certain UE status events (e.g., UE reachable state is changed, UE entering certain location, etc.). The purpose of the new flag is to indicate to the MME to fetch the UE status information. In some embodiments, such UE status information, together with a confirmation that the PCRF subscribed UE status events are armed, is included in the Update Bearer Response or Update PDP Context Response message, and also in the CCR-Update message over Gx sent from the PCEF to the PCRF. In some embodiments, during inter MME/SGSN mobility procedure, such PCRF subscribed UE status events are transferred from the source MME/SGSN to the target MME/SGSN.

Figure 5:
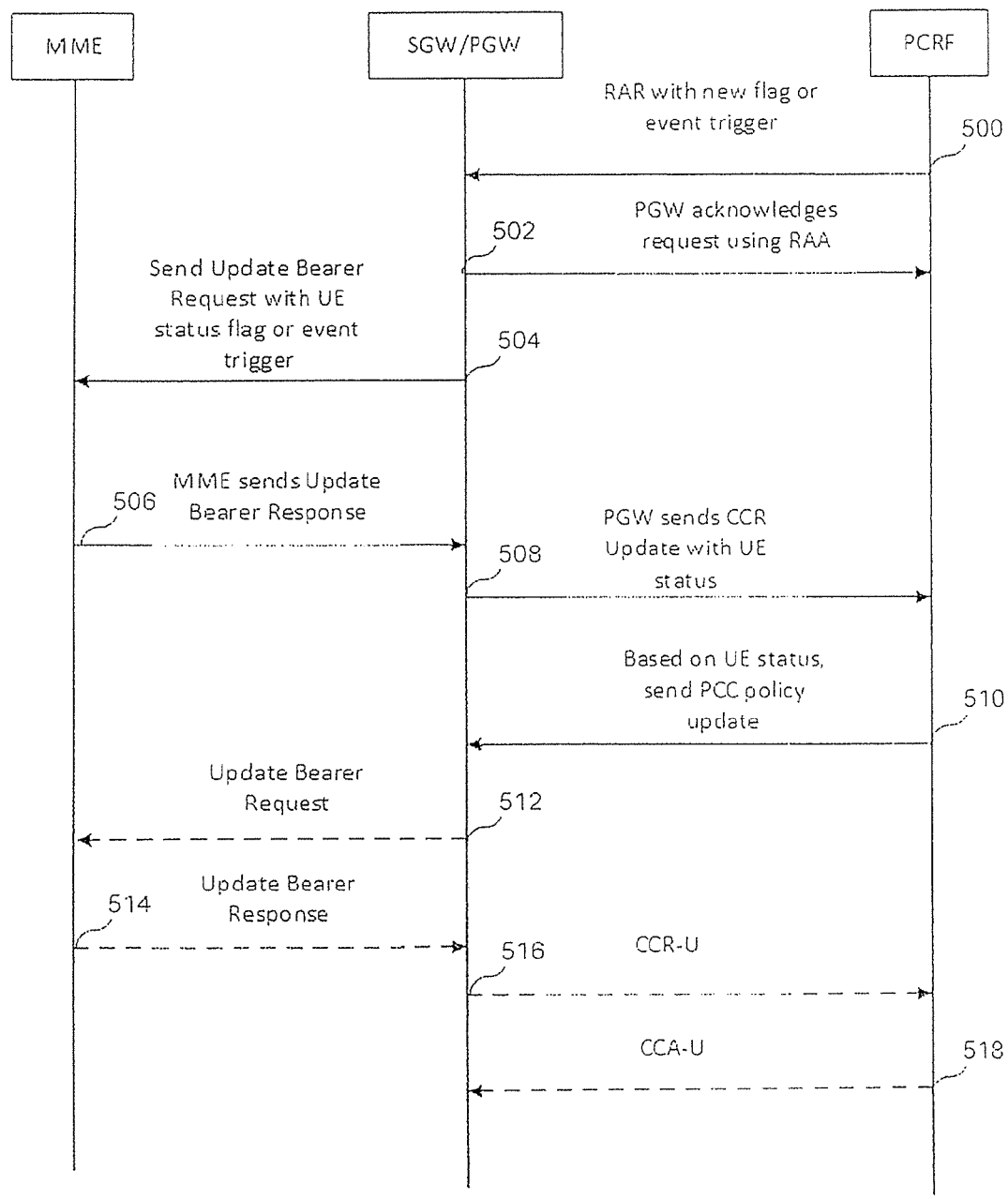
FIG. 5 is a sequence diagram according to some embodiments.

FIG. 5 illustrates an embodiment of a sequence diagram in which the PCRF requests UE status information. In step 500, the PCRF sends a RAR message with either a new flag or event trigger to the SGW or PGW (hereinafter SGW/PGW). This RAR message may be send when the PCRF needs to trigger an IP-CAN modification procedure where the PCRF needs interaction with the UE. The RAR message may be sent over a Gx (i.e., G-type interface). In step 502, the SGW/PGW acknowledges the request using a Re-Auth-Answer (RAA) message. In step 504, the SGW/PGW sends an Update Bearer Request message with the UE status flag or event trigger. In step 506, the MME sends an Update Bearer Response, which includes UE status information and a confirmation that the even trigger is stored. In step 508, the PGW sends a CCR Update message with the UE status information. Based on the UE status, the PCRF determines whether the PDN modification should be continued. In this scenario, it is assumed that it is okay to proceed with the PDN modification and the PCRF sends a PCC policy update in step 510. Upon receiving the PCC policy update, the SGW/PGW sends an Update Bearer Request message to the MME in step 512. In step 514, the MME sends an Update Bearer Response to the SGW/PGW. In step 516 the SGW/PGW sends a CCR-U message to the PCRF. In step 518, the PCRF sends a CCA-U message to the SGW/PGW.

Figure 6:
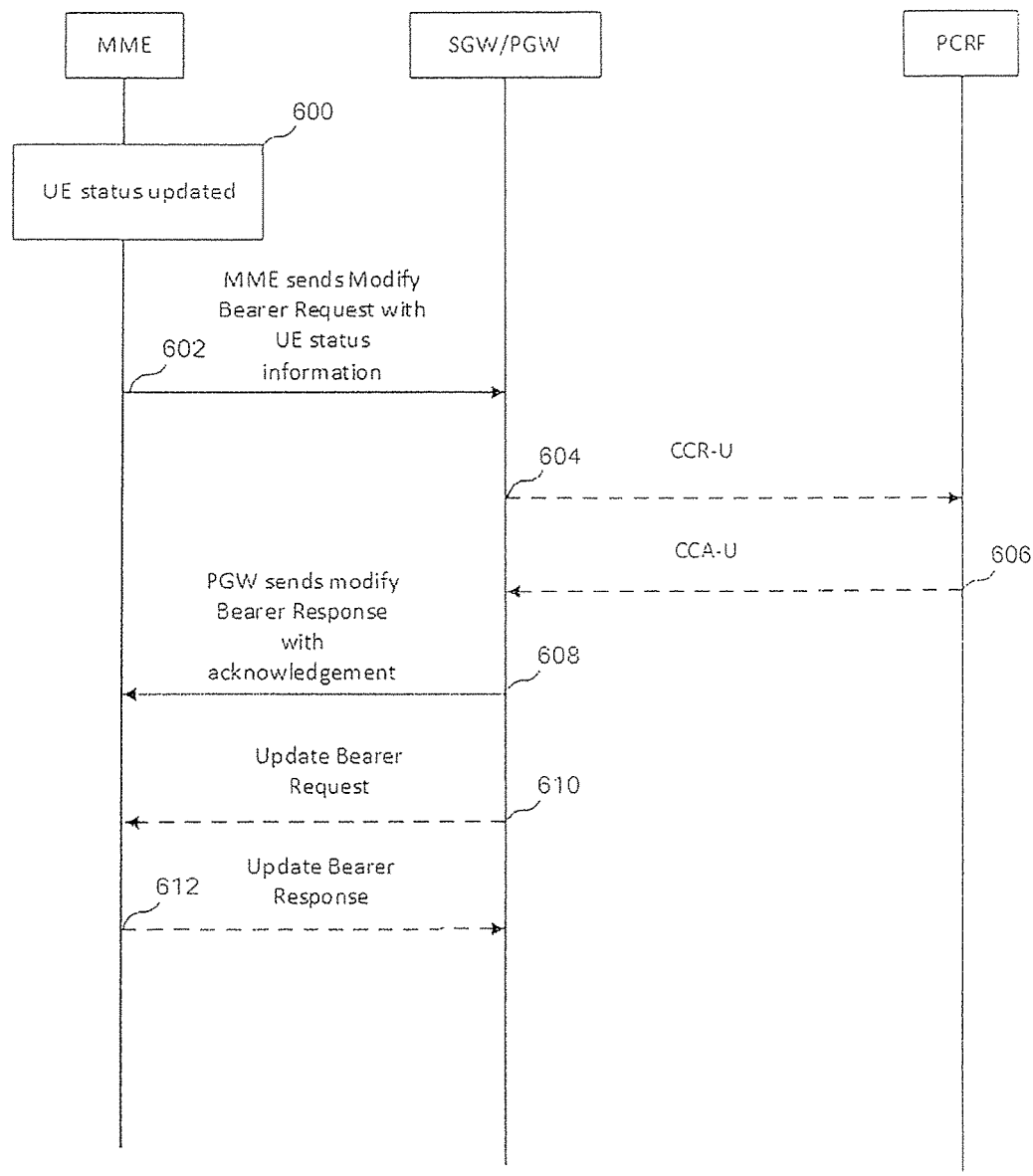
FIG. 6 is a sequence diagram according to some embodiments.

FIG. 6 is an embodiment of a sequence diagram in which the SGW/PGW and PCRF are waiting for a UE status update. The sequence diagram in FIG. 6 may be entered upon receiving a UE status update indicating that the UE is not reachable over in a power saving mode. Furthermore, the sequence diagram in FIG. 6 may be entered when the PCRF subscribes with the MME for event triggers. In step 600, the UE status is updated 600. In this situation, the updated status causes the MME to send a Modify Bearer Request with UE status information to the SGW/PGW in step 602. In step 604, the SGW/PGW sends a CCR-U message with the updated UE status to the PCRF. In step 606, the PCRF sends a CCA-U message with a PDN modification request to the SGW/PGW. In step 608, the SGW/PGW sends a Modify Bearer Response with acknowledgement. In step 610, the SGW/PGW sends an Update Bearer Request to the MME. In step 612, the MME 612 sends an Update Bearer Response.

Figure 7:
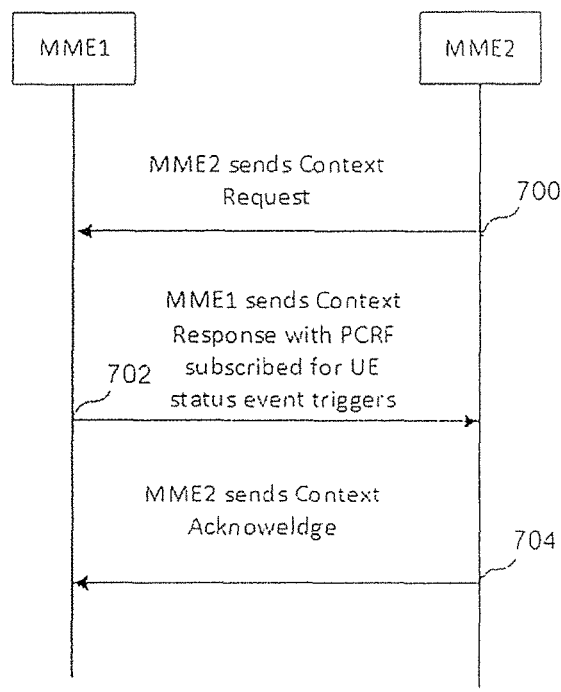
FIG. 7 is a sequence diagram according to some embodiments.

FIG. 7 is an embodiment of a sequence diagram in which the UE moves from MME1 to MME2, and the MME's exchange event trigger subscription information. It is assumed that prior to entering FIG. 7, the PCRF subscribed event triggers with MME1 for the UE, where based on this subscription, the MME1 would send UE status updates when a particular condition is met. In step 700, MME2 sends a Context Request message to MME1. In step 702, MME1 sends a Context Response identifying the PCRF that subscribed for UE status event triggers. In step 704, MME2 sends a Context Acknowledge response.

Figure 8:
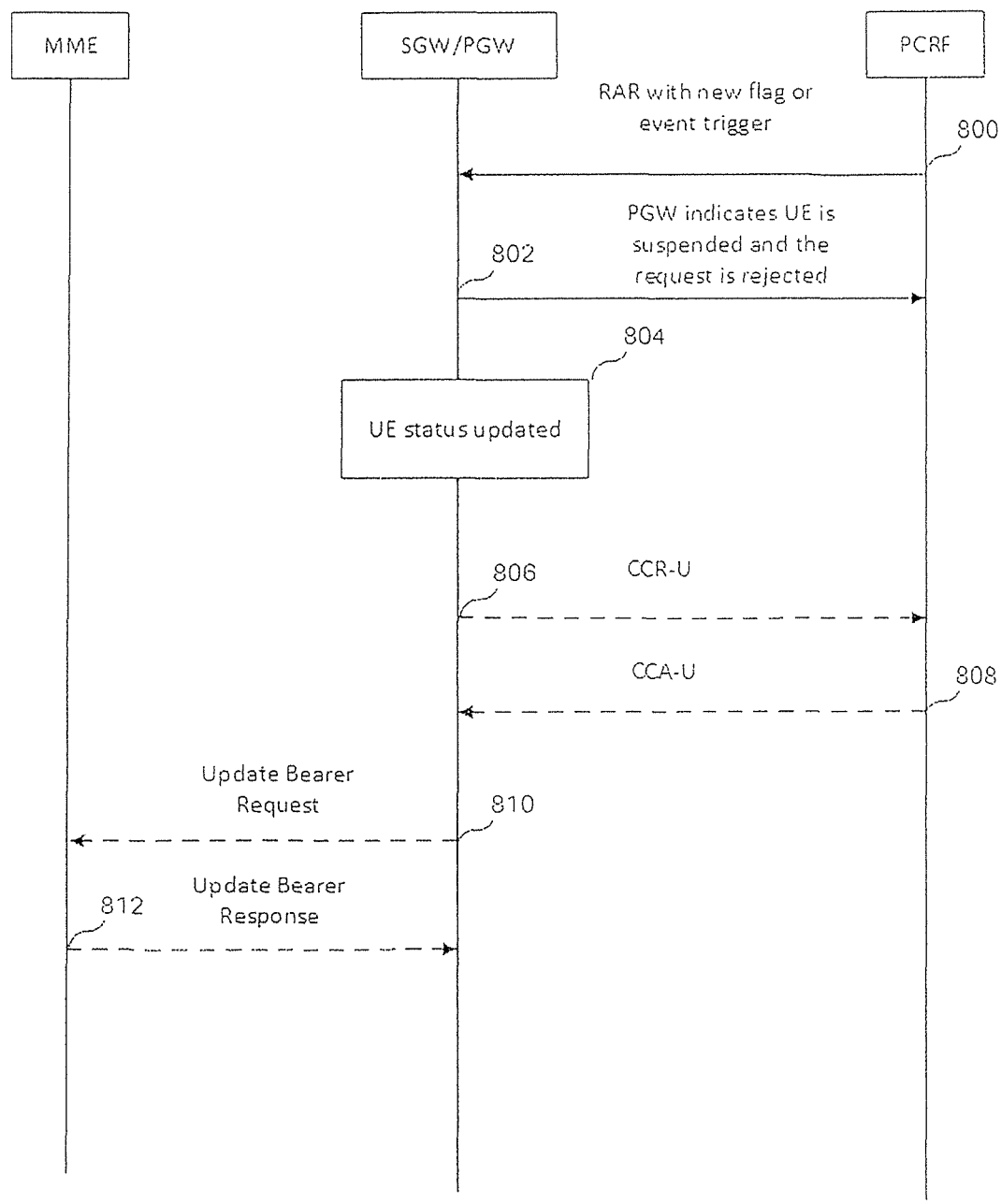
FIG. 8 is a sequence diagram according to some embodiments.

FIG. 8 is an embodiment of a sequence diagram in which the SGW/PGW provides UE status updates. In step 800 the PCRF sends a RAR with a new flag or event trigger. In this situation, it is assumed that the UE is not reachable or in a power saving mode. Accordingly, in step 802, the SGW/PGW sends a message indicating that the UE is suspended and the request for PDN modification is rejected. In step 804, the UE status is updated. In step 806, the SGW/PGW sends a CCR-U message with the UE status update. Based on this UE status update, the PCRF determines that PCRF modification should be continued and sends a CCA-U message in step 808. In step 801, the SGW/PGW sends an Update Bearer Request to the MME. In step 812, the MME sends an Update Bearer Response to the SGW/PGW.

Figure 9A:
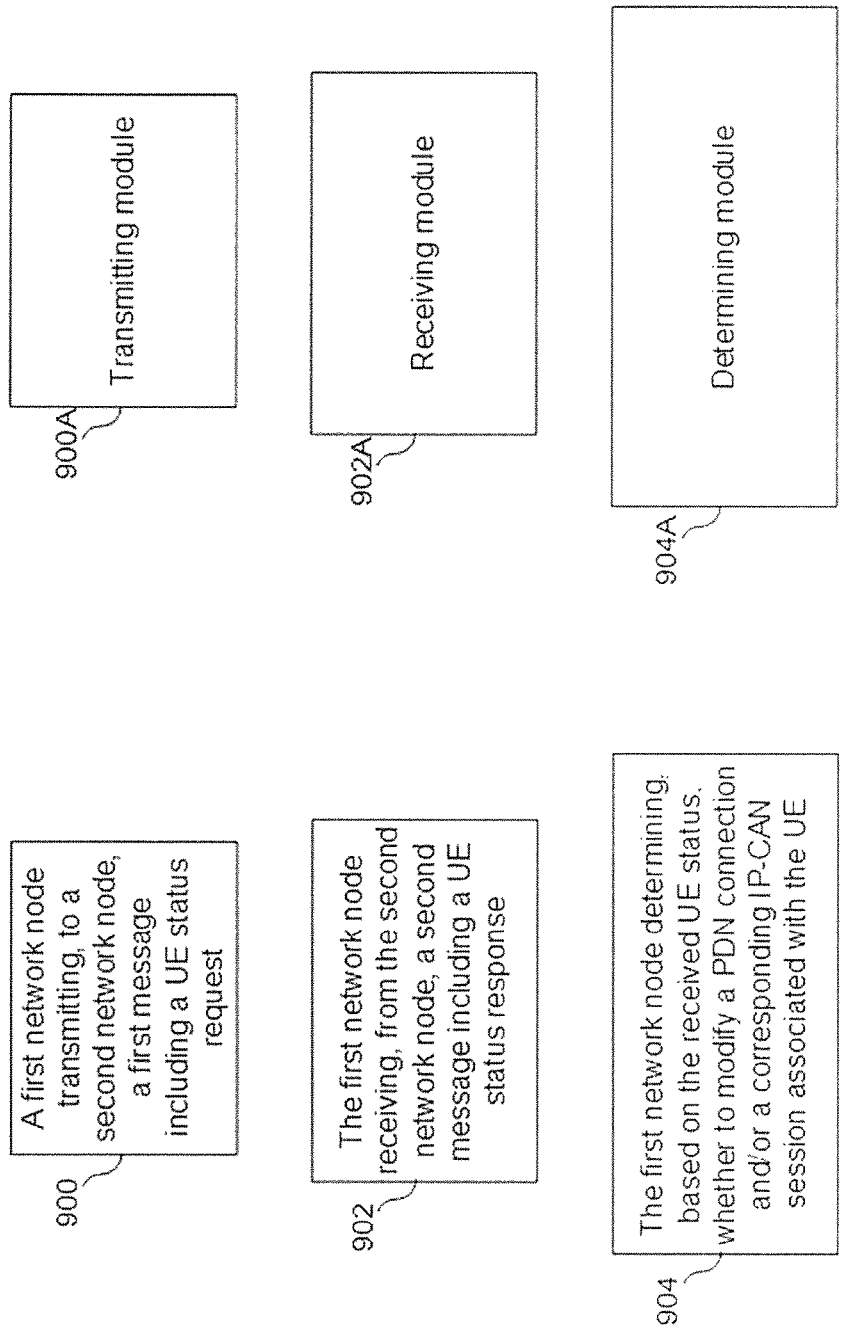
FIG. 9A is a flow chart and module diagram illustrating a process according to some embodiments.

FIG. 9A is an embodiment of a flow chart and module diagram of a process performed by the first network node such as the PCRF. The process may start at step 900 where the first network node transmits, to a second network node, a first message including a UE status request. In some embodiments, the second network node is a PGW. The transmitting module 900A is configured to perform step 900. In step 902, the first network node receives, from the second network node, a second message including a UE status response. The receiving module 902A is configured to perform step 902. In step 904, the first network node determines, based on the received UE status, whether to modify a bearer associated with the UE. The determining module 904A is configured to perform step 904.

According to some embodiments, the first message is transmitted in response to the first network node determining that a modification to the PDN connection and/or the corresponding IP-CAN session associated with the User Equipment (UE) is required. In some embodiments, the UE status response indicates at least one of (i) whether the UE is reachable, (ii) whether the UE is in an idle mode or an active mode, (iii) a location of the UE, (iv) a time zone in which the UE is located, and (v) a serving network in which the UE is registered.

According to some embodiments, in response to determining that (i) the UE status response indicates that the UE is eligible for a modification to the to the PDN connection and/or the corresponding IP-CAN session associated with the UE, and (ii) said modification is required, the first network node transmits a third message including an instruction for modifying the to the PDN connection and/or the corresponding IP-CAN session associated with the UE. Furthermore, in response to determining that the UE status response indicates that the UE is registered in a serving network having at least one policy that conflicts with the bearer associated with the UE, the first network node transmits a third message including an instruction for modifying the bearer associated with the UE to comply with the at least one policy.

According to some embodiments, the UE status request in the first message is an event trigger that causes the second network node to transmit a third message in response to determining that one or more predetermined conditions are met, the third message including a UE status indication. Furthermore, the one or more predetermined conditions specify that the third message is transmitted from the second node in response to determining that (i) the UE is reachable, (ii) the UE switches from an idle mode to an active mode, (iii) the UE moves to a predetermined location, (iv) the UE moves to a predetermined time zone, or the (v) the UE registers with a serving network having at least one policy that conflicts with the bearer associated with the UE.

According to some embodiments, after receiving the third message including the UE status indication, in response to determining that a modification to a bearer is required based on the UE status indication, the first network node transmits a fourth message including an instruction for modifying the PDN connection and/or the corresponding IP-CAN session associated with the UE. In some embodiments, the first network node is a policy and charging rules function (PCRF) node and the second network node is a mobility management entity (MME) node, SGSN, ePDG, TWAN, or HSGW. Furthermore, the first message including the UE status request may be transmitted using an S type interface. Additionally, the second message including the UE status response may be received over an N type interface.

According to some embodiments, the first message including the UE status request is transmitted using G type interface via packet data network gateway (PGW) node and to a serving gateway (SGW) node that forwards the first message to the MME node, and the SGW and PGW node receives and forwards the second message including the UE status response to the PCRF node. In some embodiments, the UE status event trigger is transferred from a source mobility management node to a target management node upon the UE moving from the source mobility management node to the target management node.

Figure 9B:
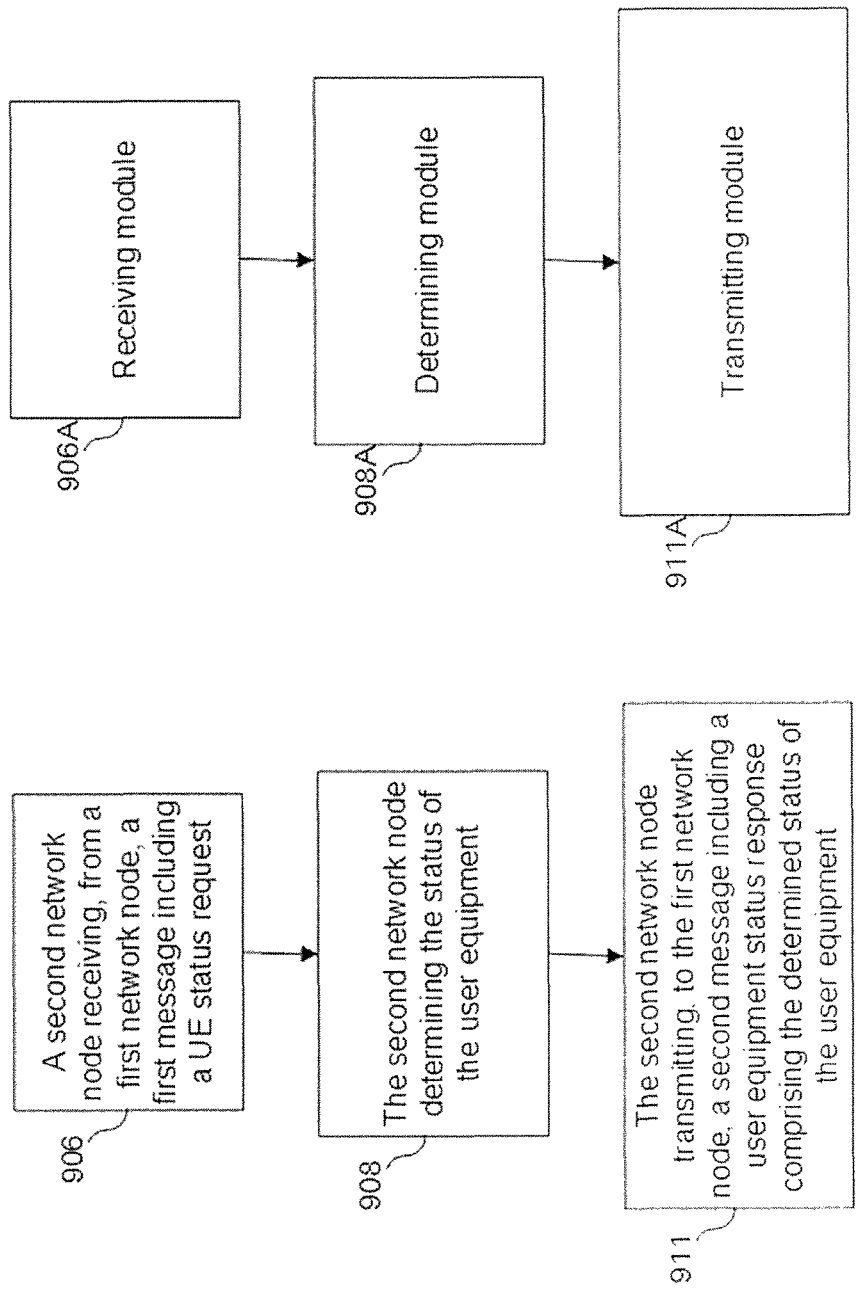
FIG. 9B is a flow chart and module diagram illustrating a process according to some embodiments.

FIG. 9B illustrates an embodiment of a flow chart and module diagram of a process performed by a second network node. In step 906, the second network node receives, from a first network node, a first message including a UE status request. The receiving module 906A is configured to perform step 906. In step 908, the second network node determines the status of the user equipment. The determining module 908A is configured to perform step 908. In step 911, the second network node is configured to transmit, to the first network node, a second message including a user equipment status response comprising the determined status of the user equipment. The transmitting module 911A is configured to perform step 911.

Figure 10:
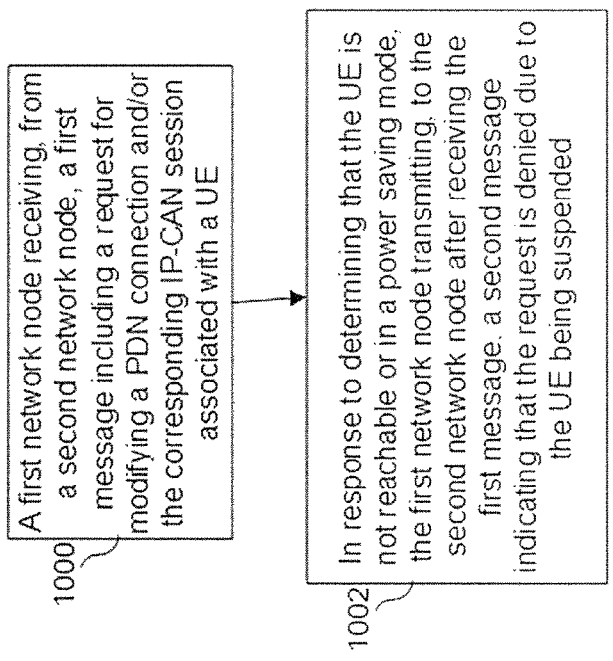
FIG. 10 is a flow chart illustrating a process according to some embodiments.

FIG. 10 illustrates an embodiment of a process performed by a first network node such a PGW. The process may start at step 1000 where the first network node receives, from a second network node, a first message including a request for modifying message including a request for modifying a PDN connection and/or the corresponding IP-CAN session associated with a UE. In some embodiments, the second network node is a PCRF node. In step 1002, in response to determining that the UE is suspended, the first network node transmits, to the second network node after receiving the first message, a second message indicating that the request denied due to the UE being suspended.

Figure 11:
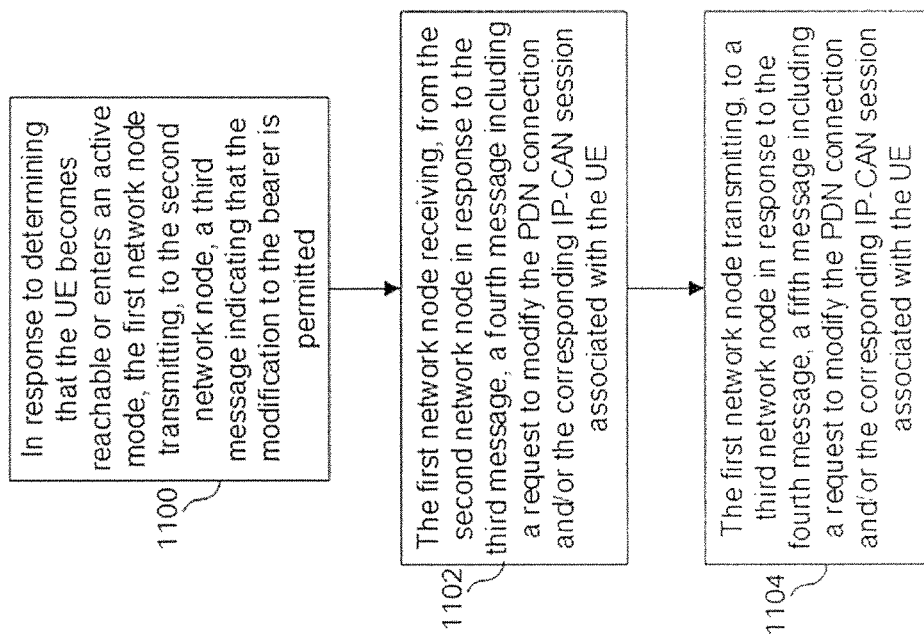
FIG. 11 is a flow chart illustrating a process according to some embodiments.

FIG. 11 illustrates an embodiment of a process performed by a first network node such as a PGW. The process may start at 100 where, in response to indicating that the UE becomes reachable, the first network node transmits, to the second network node, a third message indicating that the modification to the bearer is permitted. In some embodiments the second network node is a PCRF. In step 1102, the first network node further receives, from the second network node in response to the third message, a fourth message including a request to modify the PDN connection and/or the corresponding IP-CAN session associated with the UE. In step 1104, the first network node further transmits, to a third network node in response to the fourth message, a fifth message including a request to update the PDN connection and/or the corresponding IP-CAN session associated with the UE.

According to some embodiments, the first network node is a packet data network gateway (PGW) node and the second network node is a policy and charging rules function (PCRF) node. In some embodiments, the third network node is a mobility management node.

Figure 12:
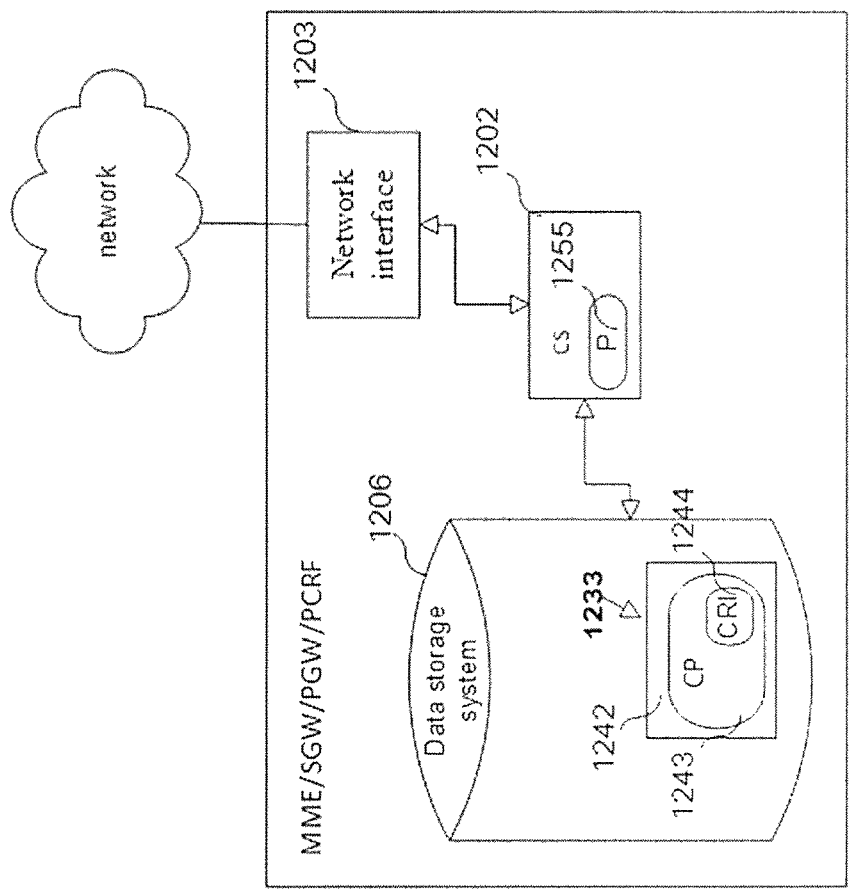
FIGS. 12 and 13 are apparatus illustrations according to some embodiments.

FIG. 12 is a block diagram of an embodiment of a network node, for example, the first or second network nodes. Such a network node may be the MME, SGW, PGW, PCRF, or SCEF. As shown in FIG. 12, the network node may include or consist of: a computer system (CS) 1202, which may include one or more processors 1255 (e.g., a general purpose microprocessor) and/or one or more circuits, such as an application specific integrated circuit (ASIC), field-programmable gate arrays (FPGAs), a logic circuit, and the like; a network interface 1203 for use in connecting the network node to a network; and a data storage system 1206, which may include one or more non-volatile storage devices and/or one or more volatile storage devices (e.g., random access memory (RAM)). In embodiments where the network node includes a processor 1255, a computer program product (CPP) 1233 may be provided. CPP 1233 includes or is a computer readable medium (CRM) 1242 storing a computer program (CP) 1243 comprising computer readable instructions (CRI) 1244. CRM 1242 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1244 of computer program 1243 is configured such that when executed by computer system 1202, the CRI causes the network node to perform steps described above (e.g., steps described above with reference to the flow charts and message flows shown in the drawings). In other embodiments, the network node may be configured to perform steps described herein without the need for a computer program. That is, for example, computer system 1202 may consist merely of one or more ASICs. Hence, the features of the embodiments described herein may be implemented in hardware and/or software.

Figure 13:
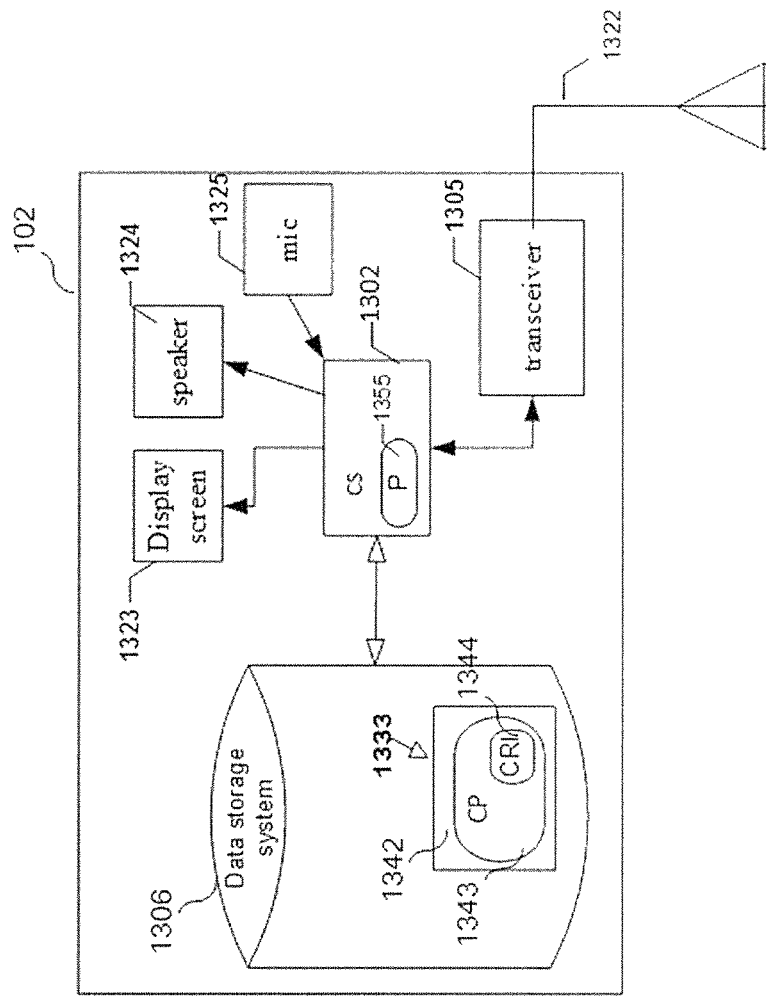

FIG. 13 is a block diagram of UE 302 according to some embodiments. As shown in FIG. 13, UE 302 may include or consist of: a computer system (CS) 1302, which may include one or more processors 1355 (e.g., a general purpose microprocessor) and/or one or more circuits, such as an application specific integrated circuit (ASIC), field-programmable gate arrays (FPGAs), a logic circuit, and the like; a transceiver 1305, coupled to an antenna, 1322 for transmitting and receiving data wireless; and a data storage system 1306, which may include one or more non-volatile storage devices and/or one or more volatile storage devices (e.g., random access memory (RAM)). In embodiments where UE 102 includes a processor 1355, a computer program product (CPP) 1333 may be provided. CPP 1333 includes or is a computer readable medium (CRM) 1342 storing a computer program (CP) 1343 comprising computer readable instructions (CRI) 1344. CRM 1342 is a non-transitory computer readable medium, such as, but not limited, to magnetic media (e.g., a hard disk), optical media (e.g., a DVD), solid state devices (e.g., random access memory (RAM), flash memory), and the like. In some embodiments, the CRI 1344 of computer program 1343 is configured such that when executed by computer system 1302, the CRI causes the UE 102 to perform steps described above (e.g., steps described above with reference to the flow charts and message flows shown in the drawings). In other embodiments, UE 102 may be configured to perform steps described herein without the need for a computer program. That is, for example, computer system 1302 may consist merely of one or more ASICs. Hence, the features of the embodiments described herein may be implemented in hardware and/or software. As shown in FIG. 13, UE 102 may include: a display screen 1333, a speaker 1324, and a microphone ("mica"), all of which are coupled to CS 1302.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

ABBREVIATIONS

EPC Evolved packet Core
LTE Long Term Evolution
MTC Machine Type Communication
UE User Equipment
PGW Packet Data Network Gateway
SAE System Architecture Evolution
SGW Servicing Network Gateway
TAU Track Area Update

The invention claimed is:
1. A method, performed in a first network node, for managing at least one of a Packet Data Network (PDN) connection and a corresponding Internet Protocol-Connec- tivity Access Network (IP-CAN) session associated with a user equipment, the first network node being configured for use in a wireless communications network, the method comprising:

determining a need to perform a modification procedure for modifying at least one of the PDN connection and the corresponding IP-CAN session associated with the user equipment;

as a result of determining the need to perform the modification procedure, transmitting, to a second network node, a request for a status of the user equipment, wherein the request comprises an event trigger that causes the second network node to transmit a message in response to determining that one or more predetermined conditions are met;

receiving, from the second network node, a first response comprising a user equipment status indication, wherein the first response indicates that the user equipment is unreachable or in a power saving mode;

as a result of receiving the first response to the request, determining to postpone the performance of the modification procedure;

receiving, from the second network node, a second response to the request after receiving the first response, wherein the second response comprises the user equipment status indication and an indication that at least one of the one or more predetermined conditions are met;

determining, based on the received second response, whether to perform the modification procedure for modifying at least one of the PDN connection and the corresponding IP-CAN session associated with the user equipment.

2. The method of claim 1, further comprising:

as a result of receiving the second response, determining whether (i) the user equipment status indication indicates that the user equipment is eligible for a modification to at least one of the PDN connection and the corresponding IP-CAN session associated with the user equipment, and (ii) said modification is required; and as a result of determining that (i) the user equipment status indication indicates that the user equipment is eligible for modification, and (ii) said modification is required, the first network node transmitting an instruction to perform the modification procedure for modifying the at least one of the PDN connection and the corresponding IP-CAN session associated with the user equipment.

3. The method of claim 1, further comprising:

as a result of receiving the second response, determining whether the user equipment status indication indicates that the user equipment is registered in a serving network having at least one policy that conflicts with the bearer associated with the user equipment;

as a result of determining that the user equipment status indication indicates that the user equipment is registered in the serving network having at least one policy that conflicts with the bearer associated with the user equipment, the first network node transmitting an instruction to modify the bearer associated with the user equipment to comply with the at least one policy.

4. The method of claim 1, wherein the user equipment status indication comprises an indication of at least one of: (i) whether the user equipment is reachable, (ii) whether the user equipment is in an idle more or an active mode, (iii) a location of the user equipment, (iv) a time zone in which the user equipment is located, and (v) a serving network in which the user equipment is registered.

5. The method of claim 4, wherein the one or more predetermined conditions comprise determining that at least one or more of: (i) the user equipment is reachable, (ii) the user equipment switches from an idle mode to an active mode, (iii) the user equipment moves to a predetermined location, (iv) the user equipment moves to a predetermined time zone, or the (v) the user equipment registers with a serving network having at least one policy that conflicts with the bearer associated with the user equipment.

6. The method of claim 4, further comprising:

as a result of receiving the second response, determining whether a modification to a bearer is required based on the user equipment status indication;

as a result of determining that the modification to a bearer is required, the first network node transmitting an instruction to perform the modification procedure for modifying the at least one of the PDN connection and the corresponding IP-CAN session associated with the user equipment.

7. The method according to claim 1, wherein the first network node is a policy and charging rules function (PCRF) node and the second network node is one of: a mobility management entity (MME), a Serving General Packet Radio Service Support Node (SGSN), an evolved Packet Data Gateway (ePDG), Trusted Wireless local area network Access (TWAN), and High rate packet data Serving Gateway (HSGW).

8. The method of claim 1, wherein the request for the status of the user equipment is transmitted using an S type interface.

9. The method of claim 1, wherein the first and second responses are received over an N type interface.

10. The method of claim 1, wherein the request for the status of the user equipment is transmitted using G type interface via packet data network gateway (PGW) node and to a serving gateway (SGW) node that forwards the request to the MME node, and the SGW and PGW node receives and forwards the first and second responses to the PCRF node.

11. The method of claim 1, wherein the user equipment status event trigger is transferred from a source mobility management node to a target management node upon the user equipment moving from the source mobility management node to the target management node.

12. A first network node for managing at least one of a Packet Data Network (PDN) connection and an Internet Protocol-Connectivity Access Network (IP-CAN) session associated with a user equipment, the first network node being configured for use in a wireless communications network, the first network node comprising:

a processor; and a computer readable medium coupled to the processor, said computer readable medium containing instructions executable by the processor, whereby the first network node is operative to:

determine a need to perform a modification procedure for modifying at least one of the PDN connection and the corresponding IP-CAN session associated with the user equipment;

as a result of determining the need to perform the modification procedure, transmit, to a second network node, a request for a status of the user equipment, wherein the request comprises an event trigger that causes the second network node to transmit a message in response to determining that one or more predetermined conditions are met;

receive, from the second network node, a first response comprising a user equipment status indication, wherein the first response indicates that the user equipment is unreachable or in a power saving mode;

as a result of receiving the first response to the request, determine to postpone the performance of the modification procedure;

receive, from the second network node, a second response to the request after receiving the first response, wherein the second response comprises the user equipment status indication and an indication that at least one of the one or more predetermined conditions are met;

determine, based on the received second response, whether to perform the modification procedure for modifying at least one of the PDN connection and the corresponding IP-CAN session associated with the user equipment.

13. The first network node of claim 12, wherein the first network node is further operative to:

as a result of receiving the second response, determine whether (i) the user equipment status indication indicates that the user equipment is eligible for a modification to at least one of the PDN connection and the corresponding IP-CAN session associated with the user equipment, and (ii) said modification is required; and as a result of determining that (i) the user equipment status indication indicates that the user equipment is eligible for modification, and (ii) said modification is required, transmit an instruction to perform the modification procedure for modifying the at least one of the PDN connection and the corresponding IP-CAN session associated with the user equipment.

14. The first network node of claim 12, wherein the first network node is further operative to:

as a result of receiving the second response, determine whether the user equipment status indication indicates that the user equipment is registered in a serving network having at least one policy that conflicts with the bearer associated with the user equipment;

as a result of determining that the user equipment status indication indicates that the user equipment is registered in the serving network having at least one policy that conflicts with the bearer associated with the user equipment, transmit an instruction to modify the bearer associated with the user equipment to comply with the at least one policy.

15. The first network node of claim 12, wherein the user equipment status indication comprises an indication of at least one of: (i) whether the user equipment is reachable, (ii) whether the user equipment is in an idle more or an active mode, (iii) a location of the user equipment, (iv) a time zone in which the user equipment is located, and (v) a serving network in which the user equipment is registered.

16. The first network node of claim 10, wherein the one or more predetermined conditions comprise determining that at least one or more of: (i) the user equipment is reachable, (ii) the user equipment switches from an idle mode to an active mode, (iii) the user equipment moves to a predetermined location, (iv) the user equipment moves to a predetermined time zone, or the (v) the user equipment registers with a serving network having at least one policy that conflicts with the bearer associated with the user equipment.

17. The first network node of claim 10, wherein the first network node is further operative to:

as a result of receiving the second response, determine whether a modification to a bearer is required based on the user equipment status indication;

as a result of determining that the modification to a bearer is required, transmit an instruction to perform the modification procedure for modifying the at least one of the PDN connection and the corresponding IP-CAN session associated with the user equipment.

18. The first network node according to claim 12, wherein the first network node is a policy and charging rules function (PCRF) node and the second network node is a mobility management entity (MME), a Serving General Packet Radio Service Support Node (SGSN), an evolved Packet Data Gateway (ePDG), Trusted Wireless local area network Access (TWAN), or High rate packet data Serving Gateway (HSGW).

19. The first network node of claim 12, wherein the request for the status of the user equipment is transmitted using an S type interface.

20. The first network node of claim 12, wherein the first and second responses are received over an N type interface.

21. The first network node of claim 12, wherein the request for the status of the user equipment is transmitted using G type interface via packet data network gateway (PGW) node and to a serving gateway (SGW) node that forwards the request to the MME node, and the SGW and PGW node receives and forwards the first and second responses to the PCRF node.

22. The first network node of claim 12, wherein the user equipment status event trigger is transferred from a source mobility management node to a target management node upon the user equipment moving from the source mobility management node to the target management node.

23. A computer product for managing a first network node, for managing at least one of a Packet Data Network (PDN) connection and an Internet Protocol-Connectivity Access Network (IP-CAN) session associated with a user equipment, the first network node being configured for use in a wireless communications network, the computer product comprising a non-transitory computer readable medium storing computer instructions for:

determining a need to perform a modification procedure for modifying at least one of the PDN connection and the corresponding IP-CAN session associated with the user equipment;

as a result of determining the need to perform the modification procedure, transmitting, to a second network node, a request for a status of the user equipment, wherein the request comprises an event trigger that causes the second network node to transmit a message in response to determining that one or more predetermined conditions are met;

receiving, from the second network node, a first response comprising a user equipment status indication, wherein the first response indicates that the user equipment is unreachable or in a power saving mode; as a result of receiving the first response to the request, determining to postpone the performance of the modification procedure;

receiving, from the second network node, a second response to the request after receiving the first response, wherein the second response comprises the user equipment status indication and an indication that at least one of the one or more predetermined conditions are met;

determining, based on the received second response, whether to perform the modification procedure for modifying at least one of the PDN connection and the corresponding IP-CAN session associated with the user equipment.

24. A method, performed in a second network node, for managing at least one of a Packet Data Network (PDN) connection and an Internet Protocol-Connectivity Access Network (IP-CAN) session associated with a user equipment, the second network node being configured for use in a wireless communications network, the method comprising:
the second network node receiving, from a first network node, a request for a status of the user equipment, wherein the request comprises an event trigger that causes the second network node to transmit a message in response to determining that one or more predetermined conditions are met;
the second network node determining a first status of the user equipment;
as a result of determining the first status of the user equipment, the second network node transmitting a first response comprising a user equipment status indication, wherein the first response indicates that the user equipment is unreachable or in a power saving mode;
the second network node determining, after transmitting the first response to the request, that at least one of the one or more predetermined conditions are met; and
as a result of determining that at least one of the one or more predetermined conditions are met, the second network node transmitting, to the first network node, a second response, wherein the second response comprises the user equipment status indication and an indication that at least one of the one or more predetermined conditions are met,
wherein the user equipment status comprises an indication of at least one of (i) whether the user equipment is reachable, (ii) whether the user equipment is in an idle mode or an active mode, (iii) a location of the user equipment, (iv) a time zone in which the user equipment is located, and (v) a serving network in which the user equipment is registered.

25. The method of claim 24, wherein the one or more predetermined conditions comprise determining that (i) the user equipment is reachable, (ii) the user equipment switches from an idle mode to an active mode, (iii) the user equipment moves to a predetermined location, (iv) the user equipment moves to a predetermined time zone, or the (v) the user equipment registers with a serving network having at least one policy that conflicts with the bearer associated with the user equipment.

26. The method of claim 24, wherein the first network node is a policy and charging rules function (PCRF) node and the second network node is one of: a mobility management entity (MME), a Serving General Packet Radio Service Support Node (SGSN), an evolved Packet Data Gateway (ePDG), Trusted Wireless local area network Access (TWAN), and High rate packet data Serving Gateway (HSGW).

27. The method of claim 24, wherein the request for the status of the user equipment is transmitted using an S type interface.

28. The method of claim 24, wherein the first and second responses are received over an N type interface.

29. The method of claim 24, wherein the request for the status of the user equipment is transmitted using G type interface via packet data network gateway (PGW) node and to a serving gateway (SGW) node that forwards the request to the MME node, and the SGW and PGW node receives and forwards the first and second responses to the PCRF node.

30. The method of claim 24, wherein the second network node is a source mobility management node and the user equipment status event trigger is transferred from the source mobility management node to a target management node upon the user equipment moving from the source mobility management node to the target management node.

31. A second network node for managing at least one of a Packet Data Network (PDN) connection and an Internet Protocol-Connectivity Access Network (IP-CAN) session associated with a user equipment, the second network node being configured for use in a wireless communications network, the second network node comprising:
a processor; and
a computer readable medium coupled to the processor, said computer readable medium containing instructions executable by the processor, whereby the first network node is operative to:
receive, from a first network node, a request for a status of the user equipment, wherein the request comprises an event trigger that causes the second network node to transmit a message in response to determining that one or more predetermined conditions are met;
determine a first status of the user equipment;
as a result of determining the first status of the user equipment, transmit a first response comprising a user equipment status indication, wherein the first response indicates that the user equipment is unreachable or in a power saving mode;
determine, after transmitting the first response to the request, that at least one of the one or more predetermined conditions are met; and
as a result of determining that at least one of the one or more predetermined conditions are met, transmit, to the first network node, a second response, wherein the second response comprises the user equipment status indication and an indication that at least one of the one or more predetermined conditions are met,
wherein the user equipment status comprises an indication of at least one of (i) whether the user equipment is reachable, (ii) whether the user equipment is in an idle mode or an active mode, (iii) a location of the user equipment, (iv) a time zone in which the user equipment is located, and (v) a serving network in which the user equipment is registered.

32. The second network node of claim 31, wherein the one or more predetermined conditions comprise determining that (i) the user equipment is reachable, (ii) the user equipment switches from an idle mode to an active mode, (iii) the user equipment moves to a predetermined location, (iv) the user equipment moves to a predetermined time zone, or the (v) the user equipment registers with a serving network having at least one policy that conflicts with the bearer associated with the user equipment.

33. The second network node of claim 31, wherein the first network node is a policy and charging rules function (PCRF) node and the second network node is a mobility management entity (MME), a Serving General Packet Radio Service Support Node (SGSN), an evolved Packet Data Gateway (ePDG), Trusted Wireless local area network Access (TWAN), or High rate packet data Serving Gateway (HSGW).

34. The second network node of claim 31, wherein the request for the status of the user equipment is transmitted using an S type interface.

35. The second network node of claim 31, wherein the first and second responses are received over an N type interface.

36. The second network node of claim 31, wherein the request for the status of the user equipment is transmitted using G type interface via packet data network gateway (PGW) node and to a serving gateway (SGW) node that forwards the request to the MME node, and the SGW and PGW node receives and forwards the first and second responses to the PCRF node.

37. The second network node of claim 31, wherein the second network node is a source mobility management node and the user equipment status event trigger is transferred from the source mobility management node to a target management node upon the user equipment moving from the source mobility management node to the target management node.

* * * * *